United States Patent
Reck

[11] 3,835,450
[45] Sept. 10, 1974

[54] MOTOR VEHICLE INDICATOR SYSTEMS
[75] Inventor: Lothar Reck, Russelsheim, Germany
[73] Assignee: General Motors Corporation, Detroit, Mich.
[22] Filed: Dec. 19, 1972
[21] Appl. No.: 316,581

[30] Foreign Application Priority Data
Dec. 29, 1971 Germany............................ 2165213

[52] U.S. Cl.................... 340/52 F, 178/28, 340/21, 340/324 R, 340/378 R, 340/412, 340/415
[51] Int. Cl. .......................................... G08b 19/00
[58] Field of Search.............. 340/21, 52, 52 F, 180, 340/181, 324 R, 324 B, 324 S, 378, 413, 373, 27 R, 52 R, 412, 414, 415, 378 MW, 316, 317, 318; 178/28, 34

[56] References Cited
UNITED STATES PATENTS
| | | | |
|---|---|---|---|
| 3,222,666 | 12/1965 | Hallden............................... | 340/324 |
| 3,267,456 | 8/1966 | Morris et al. ....................... | 340/325 |
| 3,307,170 | 2/1967 | Aoyama et al...................... | 340/324 |

Primary Examiner—John W. Caldwell
Assistant Examiner—Joseph E. Nowicki
Attorney, Agent, or Firm—Howard N. Conkey

[57] ABSTRACT

A system for indicating operating conditions in motor vehicles comprises a warning device energised by a power source and electrically connected to the corresponding switches or measuring instruments for the respective vehicle mechanisms, any failure in one or more of the vehicle mechanisms to be monitored being indicated by a single stationary warning lamp arranged on the instrument panel in the field of vision of the driver, the lamp illuminating in each instance one field on a scale which is divided into several fault indicating fields and is arranged on a rotatable drum movable by a motor relative to the warning lamp and so controlled, that one field indicating the respective fault is illuminated by the warning lamp; in the event of a failure in more than one of the vehicle mechanisms provision is made to move the scale after a delay period to illuminate another fault indicating field of the scale.

4 Claims, 7 Drawing Figures

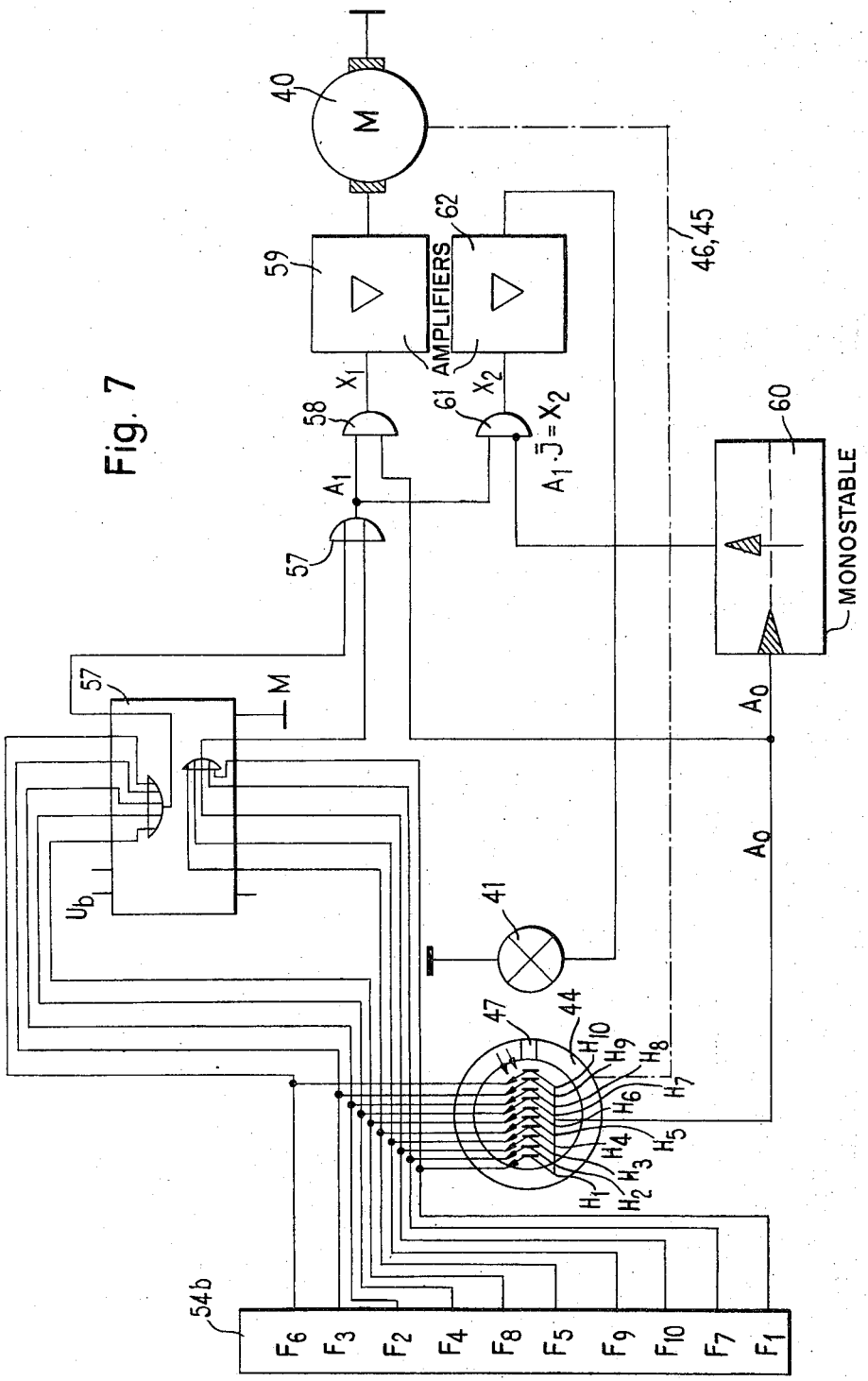

MOTOR VEHICLE INDICATOR SYSTEMS

This invention relates to a system for indicating operating conditions in motor vehicles and comprising a warning device which is fed from a power source and is electrically connected to the corresponding switches or measuring instruments on the respective vehicle mechanisms which are to be monitored.

In the operation of a motor vehicle, increasing use is made of warning indicating devices, particularly for safety systems, so that the number of indicating lamps used for this purpose is steadily rising. The plurality of indicating lamps employed not only increases the space requirements at the instrument panel but also impairs lucidity of arrangement. Consequently, in the event of warning, the respective indicating lamps may be overlooked. A known warning system of the above mentioned kind and one which is characterised by a large number of lamps, is disclosed for example in German specification DOS 1,942,021.

The problem of the present invention is to develop a system which is easy of survey, not liable to be overlooked and is as reliable as possible. The invention solves this problem by arranging that a single warning lamp arranged in the field of vision of the driver, preferably on the instrument panel, serves as a warning device common to all the vehicle mechanisms to be monitored, the lamp illuminating one field each time on a scale divided into several fault-indicating fields and that the scale — controlled by the particular fault — is movable by motor power relative to the warning lamp in such a way that the respective fault-indicating field is illuminated.

A fault scale according to the invention, moved relative to the warning lamp and arrested at the place corresponding to the particular fault, affords the possibility of making do with one single warning lamp. Fundamentally, it is merely a question of the relative movement between scale and warning lamp, so that it would also be possible to move the lamp past the stationary scale. Ease of survey by the driver is increased however, if the warning lamp always lights up at the same place. Hence it is preferable that the lamp is arranged stationarily and the scale is made movable.

Lucidity and ease of survey are enhanced still more however, according to a further feature of the invention, if the scale is arranged behind the instrument panel, and this latter is provided with a cavity in the region of the scale to correspond with the size of the fault-indicating field. The result is that the driver can only observe or recognise just that fault field which finds itself at the cavity in the instrument panel. Confusion in identifying the faults is thereby avoided. Another advantageous effect along these lines is attained by a further feature of the invention which is characterised by the fact that the light from the warning lamp can be restricted to a fault-indicating field of the scale by means of a mirror.

Of itself, the scale may assume any form. However, its actuation is facilitated considerably if the scale is arranged at the periphery of a rotatable drum and the warning lamp is arranged inside the drum. Appropriately, in addition to the warning lamp, there is also room for the drum-operating drive as well as the electronic control elements, and the drum thus forms a housing for these parts. Consequently, in the event of warning, the warning panel for the particular fault can be illuminated from the interior of the drum.

In order to ensure rapid indication of the fault immediately after it occurs, it is of advantage if, with the battery switched on, the scale is continuously moved by an electric motor and is stopped at the appropriate place in the event of a warning, whilst at the same time the warning lamp is switched on. Also possible is another embodiment according to which the scale is moved by an electric motor solely in the event of a fault and is arrested again at the moment when the particular fault-indicating field finds itself in front of the warning lamp simultaneously switched on.

In order that faults may be indicated consecutively when several of them occur simultaneously, a further concept of the invention proposes that the electric motor or the scale driven by it, starts up again after a delay period sufficient for perception of the warning signal by the driver. If the fault first indicated has not been eliminated in the intermediate period, it is always presented again after each rotation of the drum.

The fault signals from a fault input may be picked up either mechanically by a contact arm which rotates with the drum and scans contacts appropriately arranged in a circle, or they may be picked up contactlessly by photo-sensitive semiconductor elements with the aid of a light gate.

The scope of the invention is defined by the appended claims; and the invention and the method by which it is to be performed are hereinafter particularly described with reference to the accompanying drawings in which:

FIG. 7 is a further embodiment of a switching arrangement for controlling the warning indicating system according to FIGS. 3 and 4.

Figure 1:
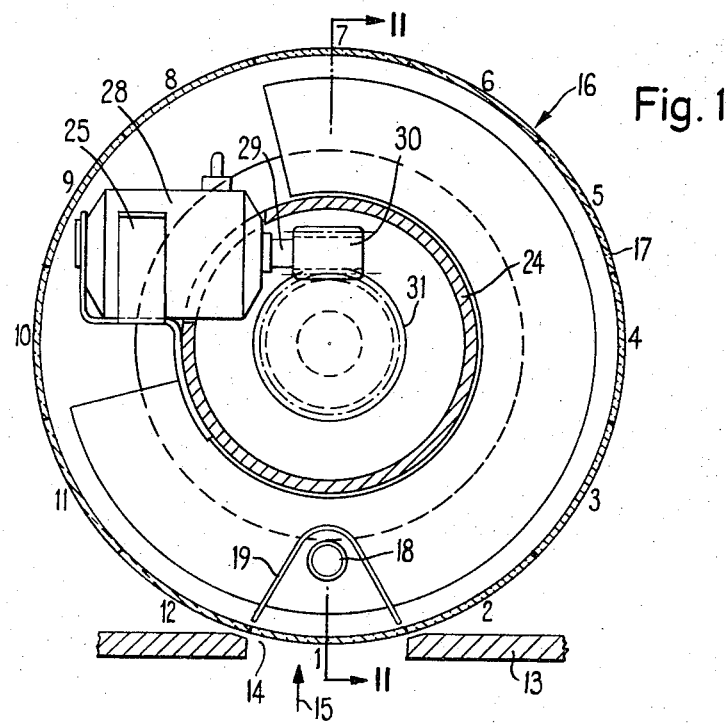
FIG. 1 shows an embodiment of the present warning indicating system with the indicating drum and drive.
Figure 2:
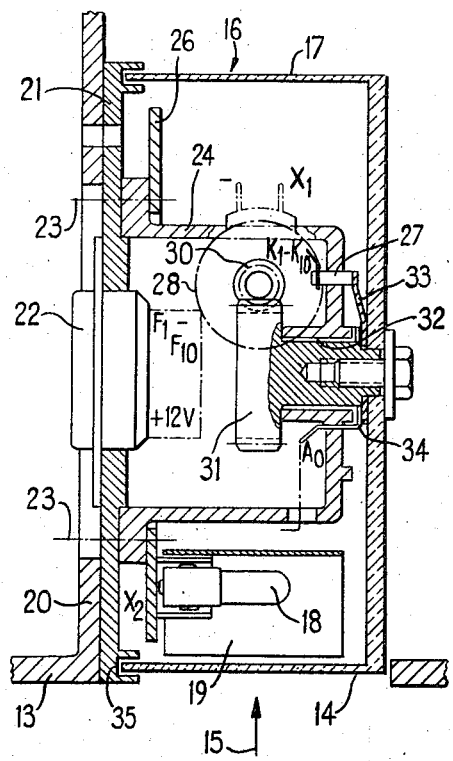
FIG. 2 is a section along line II—II in FIG. 1.

According to FIGS. 1 and 2, reference numeral 13 denotes the instrument panel of a motor vehicle and 14 a cavity in the instrument panel 13. The direction of vision of the driver is indicated by an arrow 15. Reference numeral 16 denotes a fault-indicating drum arranged rotatably behind the instrument panel 13. The drum housing is made transparent at the periphery 17 and is divided into 12 fault-indicating fields. The size of each of the fault-indicating fields 1 – 12 corresponds to the dimensions of the cavity 14 in the instrument panel 13 so that only one of the fields is visible at a time by the driver, namely that one which corresponds to the particular fault and is consequently located just behind the cavity 14. The particular fault-indicating field is illuminated outwards from the inside by a warning lamp 18 which is arranged stationarily inside drum 16. The warning lamp 18 lies at the focal point of a parabolic mirror 19 which limits the beam path to the fault-indicating field located in front of the warning lamp 18 at the time (in FIG. 1, the field 1).

As will be seen from FIG. 2, the rotatable drum 16 encloses a circular base plate 21 which is secured to a platform 20 of the instrument panel 13 and on which is secured a four-pole plug socket 22. A bearing cylinder 24 screwed to the base plate 21 — as sketched in by dash-dot lines 23 — carries a motor holder 25 (FIG. 1) made of spring steel or resilient plastics material, as well as a support plate 26 for the circuit with warning lamp 18, and a contact ring 27. This contact ring 27 is also apparent particularly from FIGS. 5 and 6 and will be further described in greater detail below.

As will be seen from FIG. 1, the motor holder 25 carries an electric motor 28 which serves for driving drum 16. With this object the motor armature shaft 29 carries a worm 30 which engages in a worm wheel 31 rotatably mounted in the bearing 32 of cylinder 24. The indicating drum 16 is firmly screwed to the worm wheel 31. Similarly rotationally fast with the worm wheel 31 or with the drum 16, is a contact arm 33 which scans the contacts on the stationary contact ring 27 and will be described in greater detail below with reference to FIGS. 5 and 6. A corrugated spring washer 34 will compensate the axial play of the drum 16. A contact Ao is soldered to the spring washer 34. The extremity of the edge of the drum runs in a groove 35 at the rim of base plate 21. If necessary this groove may be designed as a seal. As indicated, the annular space between the bearing cylinder 24 and drum 16 may accommodate warning lamp 18, motor 28 and the electronic equipment.

Figure 3:
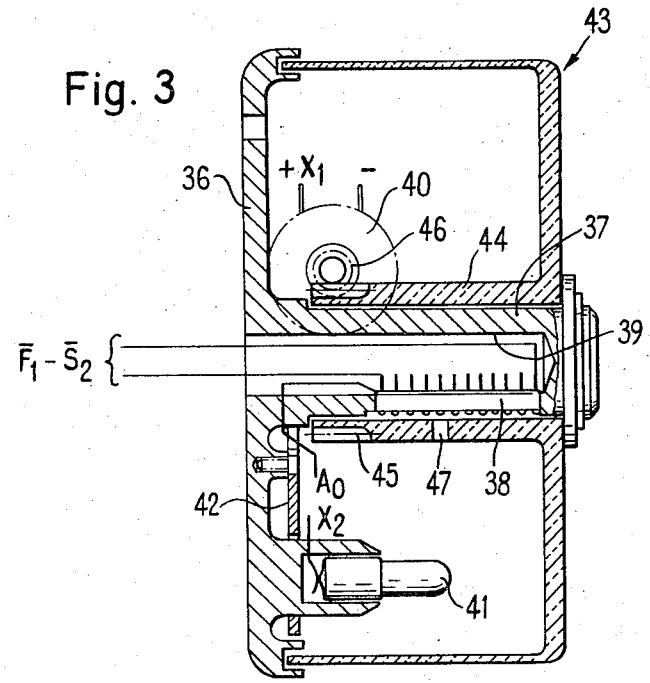
FIG. 3 is another embodiment, also with a rotatable indicating drum, in section corresponding to FIG. 2.
Figure 4:
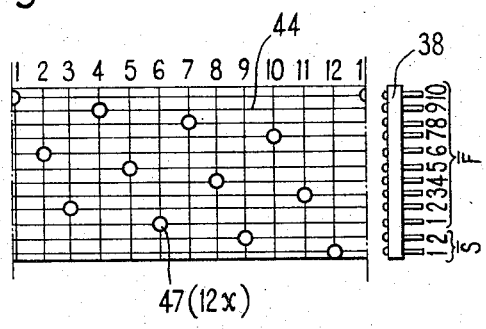
FIG. 4 shows the hollow interior of the drum according to FIG. 3 in a developed presentation (turned through 90°)

In the embodiment according to FIGS. 3 and 4, the warning equipment is constructed somewhat differently from that shown in FIGS. 1 and 2. A circular base plate 36 which (corresponding to FIG. 2 and therefore not shown in detail) is mounted on a platform of the instrument panel, is provided with a hollow-bored pivot or stud 37 on which the semiconductor elements 38 are arranged. The cable leads $F_1 - S_2$ may be passed through the bore 39 of the pivot or stud 37 to the parts of the motor vehicle to be monitored. Motor 40, warning lamp 41 and support plate 42 for the circuit are also secured to the base plate 36. The indicating drum 43 is so designed that it has a hollow interior portion 44 which is pivotally mounted on stud 37. This hollow interior portion 44 is provided with a toothed profile 45 for engagement with the driving worm 46 mounted on the motor shaft. The casing of the interior portion 44 must be opaque, so that light passes through, solely via the radial holes denoted by 47. The arrangement of the holes 47 is shown in detail in FIG. 4. In a manner which will be explained more fully below, the warning lamp 41 in this embodiment serves both for exciting the photo-sensitive semiconductor elements 38, each of which are assigned a fault input and one of the bores 47 in each case, and also for illuminating that particular fault-indicating field at the periphery of drum 43 which lies in the field of vision of the driver (see FIGS. 1 and 2).

Figure 5:
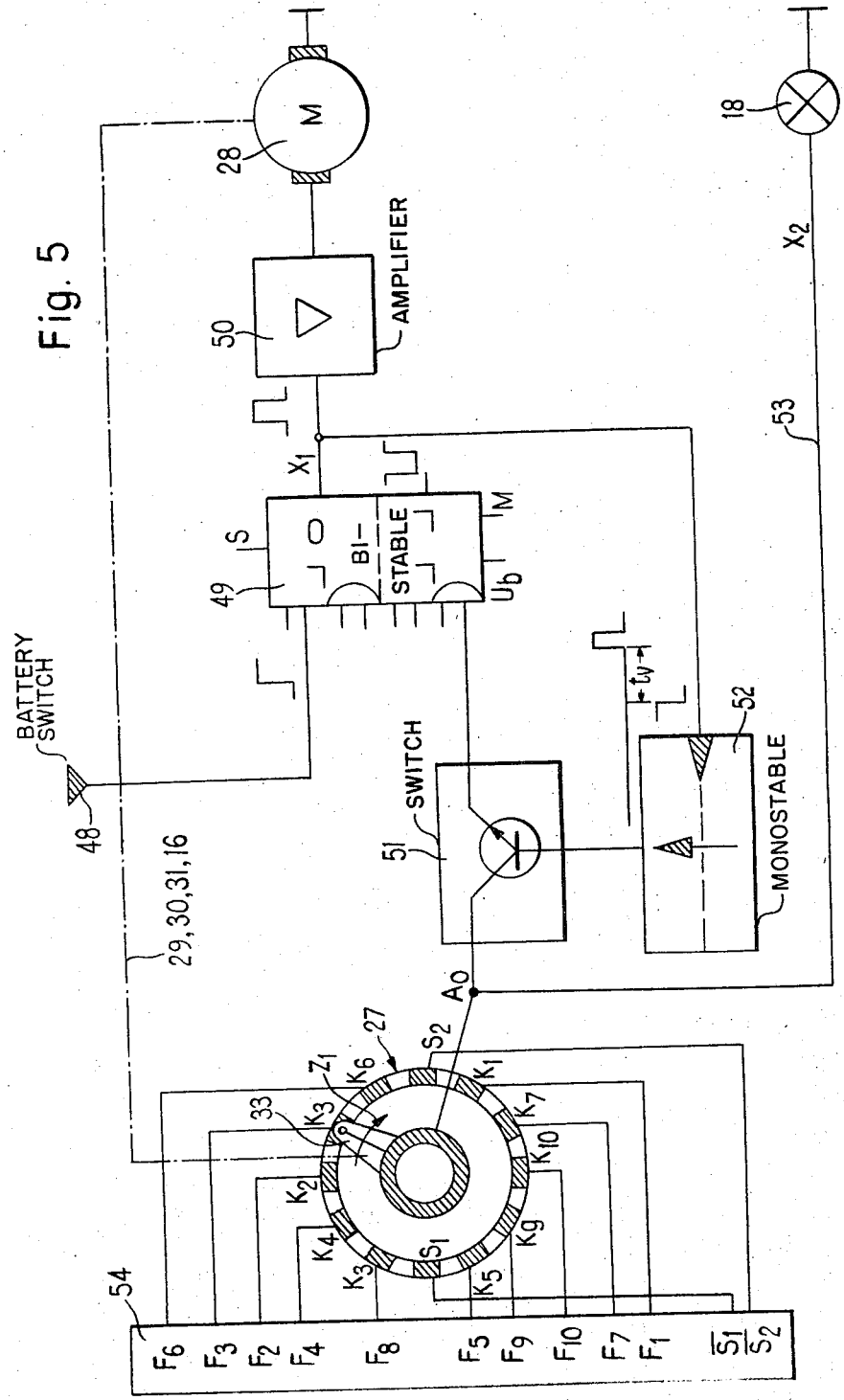
FIG. 5 is a switching arrangement for controlling the warning indicating system according to FIGS. 1 and 2.

FIG. 5 illustrates a switching arrangement for controlling the warning indicating equipment according to FIGS. 1 and 2. From the battery switch 48, an electrical connection runs via a bistable relaxation stage 49 (static store) and an amplifier 50 to the electric motor 28. Further, the input side of the bistable relaxation stage 49 is connected to a transistor switch 51 which is controlled from a monostable relaxation stage 52 (monoflop). The monostable relaxation stage 52 receives the output signal $X_1$ of the bistable relaxation stage 49, which signal also appears at the electric motor 28. The transistor switch 51 establishes the electrical connection between the above-mentioned contact arm 33 and the bistable relaxation stage 49 or the electric motor 28 as the case may be. A lead 53 branches off between the transistor switch 51 and contact arm 33, this lead supplying the warning lamp 18 with power. The mechanical connection 29, 30, 31, 16 between motor 28 and contact arm 33, as indicated in FIG. 2, is indicated by a dash-dot line in the switching arrangement of FIG. 5.

Contact arm 33 scans the contacts $K_1 - K_{10}$, $S_1$ and $S_2$, which are arranged in circular fashion on the stationary contact ring 27 (FIG. 2), likewise already mentioned. Each of the contact $K_1 - K_{10}$, $S_1$, $S_2$ is electrically connected to a fault input $F_1 - F_{10}$, $S_1$, $S_2$ on a contact strip 54.

The warning indicating system according to FIGS. 1, 2 and 5 operates as follows: When the battery is switched on, the bistable relaxation stage 49 switches over, so that motor 28 is switched on. At the monostable relaxation stage 52, $X_1$ appears as a 1-signal. Via the transmission 30, 31 (worm gear; see FIG. 2) the motor 28 drives the indicating drum 16 in the direction of rotation denoted by arrow $Z_1$. If, at the fault-input contact strip 54, a fault signal appears at a contact $K_1 - K_n$, then, when the contact arm 33 rotating with drum 16 finds itself on this particular contact "K" (in FIG. 5, say contact $K_3$), the above signal will deliver a signal Ao via the open transistor switch 51 to the bistable relaxation stage 49. This swings over, $X_1$ goes to 0-signal and the motor 28 stops. At the same time the warning lamp 18 lights up due to the fault signal passing over Ao. During transition of the signal $X_1$ from 1 to 0, the monoflop 52 will become released. This operates with delayed switching, so selected that the circuit tarries sufficiently long in the given condition to enable the driver to perceive and read the particular fault-indicating field. After expiry of the selected delay time (about 30 secs.), the monoflop closes (= interrupts) the transistor switch 51 for a short period by an impulse $J_{Sperr}$. If the battery is still switched on, the store 49 changes over again (because Ao gives an 0-signal) and motor 28 starts up again. The time duration of the signal $J_{Sperr}$ is derived from the starting period of contact arm 33 and the time required for leaving the fault contact. Then an 0-signal again appears at Ao, that is, the store 49 remains in this position and the warning light 18 goes out. Now a new fault can be indicated. If, in the meantime, the fault first indicated has still not been eliminated, it is always presented again after each rotation of the drum.

Figure 6:
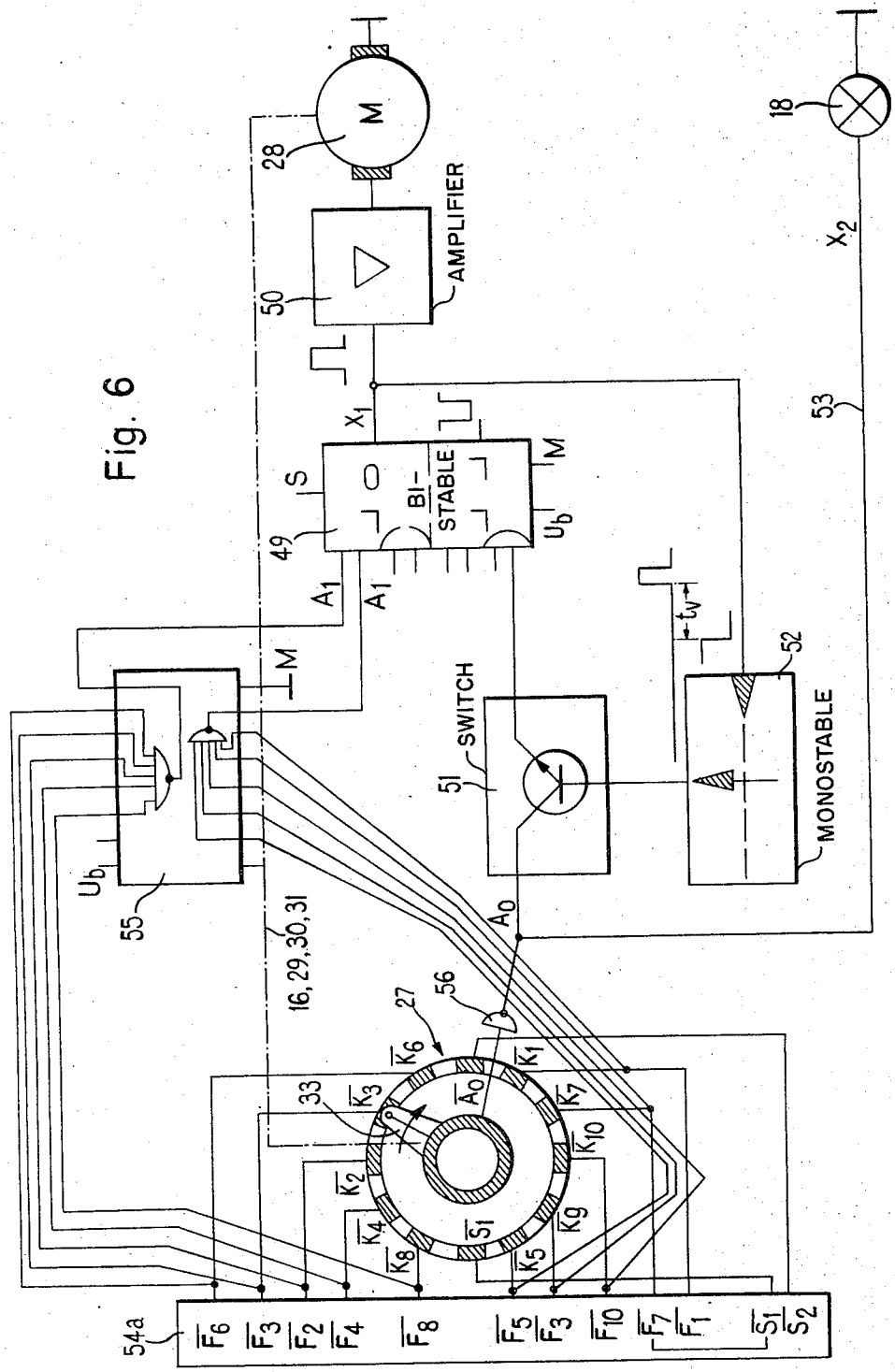
FIG. 6 is a switching arrangement, somewhat modified compared with the embodiment according to FIG. 5, for controlling the warning indicating system according to FIGS. 1 and 2.

The switching arrangement according to FIG. 6 differs from that in FIG. 5 by the additional use of a so-called NAND-section (55) which is interposed between the contacts $\overline{K_1} - \overline{K_{10}}, \overline{S_1}, \overline{S_2}$ and the bistable relaxation circuit 49. Such a NAND-section is characterised by the fact that a 1-signal exists at the output if an 0-signal appears at the input side or at all inputs. When a 1-signal appears at all inputs then the 0-signal is present at the output. When a NAND-section is employed, then, if no faults appear, all fault-inputs $\overline{F_1}$ to $\overline{F_{10}}$ and also the S-inputs $\overline{S_1}$ and $\overline{S_2}$ must be in the 1-signal condition. Any oncoming fault $\overline{F}$ whatever delivers an 0-signal to the NAND-section 55 via a contact (here $\overline{K_3}$ for example). From this section, a 1-signal passes to the static store 49, which switches over. $X_1$ becomes a 1-signal, the motor 28 with transmission 30, 31 (FIGS. 1 and 2) is switched on and the indicating drum 16 is set into rotation. Turning with the indicating drum 16, the contact arm 33 runs over contacts $\overline{K_1}$ to $\overline{K_n}$ of ring 27. The fault contact has an 0-signal so that, at this position the contact arm 33 also has an 0-signal. By means of an inverter 56, this 0-signal is converted into a 1-signal. This signal present at Ao also appears at the store 49, since the transistor switch 51 is open. Consequently, store 49 swings over. $X_1$ becomes an 0-signal and motor 28 remains stationary.

Ao also appears as $X_2$ at the indicating light 18, however. The light is therefore switched on. Due to the 1-0-transition at $X_1$, the monoflop 52 is switched on. After the set time (as described under FIG. 5) the monoflop delivers a brief suppression impulse $J_{Sperr}$ to the switch 51. If the first fault has been eliminated, motor 28 remains stationary. If however $A_1$ still appears at the NAND-section, motor 28 will continue running. Contact arm 33 then scans the contact ring 27 further, seeking faults. At each drum rotation, motor 28 remains stationary at the old position and then starts up again. This operation is repeated until the fault is eliminated and $A_1$ no longer appears. In this case ($A_1 = 0$ and Ao = 0) the store 49 is so designed that the output $X_1$ gets the 0-signal.

By appropriate wiring at the fault input 54a, it is possible, in the event of one single fault, to light up one or several fields in succession on the indicating drum 16. Thus for example, the fault input (e.g., $\overline{F_7}$) which is allocated to a defect at the brake, and will cause the indicating field "brake defect" to light up on drum 16, could be so connected to a special input, e.g., $\overline{S_1}$, that during a revolution of the drum, even the field allocated to this input and bearing say the inscription "throttle back speed," "look for nearest repair shop" will light up.

The switching arrangement according to FIG. 7 corresponds in the main to the foregoing basic circuit layout according to FIG. 6. In detail, the difference is that instead of contacts and a contact arm, light-sensitive semiconductors $H_1 - H_{10}$ are used as photo-diodes, photo-transistors, etc. The warning lamp 41 itself serves as a light source. For this purpose, the indicating drum 43 is so designed that it simultaneously takes over control of the semiconductor elements by opening up and masking lamp 41. As is apparent from FIGS. 3 and 4 and as already mentioned above, opening up and covering of the warning lamp 41 are brought about through bores 47 in the hollow interior part 44. A further difference by comparison with the circuit arrangement according to FIG. 6 is to be found in the use of an OR-section 57 instead of a NAND-section 55. Such an OR-section has the property that a 1-signal is present at its output, if a 1-signal appears at one or several inputs. If however, an 0-signal appears at all inputs, then an 0-signal is present at the output.

When a fault occurs, $A_1$ via the OR-section 57, arrives as a 1-signal at a first AND-section 58 and the light-sensitive semiconductor $H_{10}$. This latter functions as a light gate. When the semiconductor finds itself in the unilluminated condition, due to the wall of the hollow interior part 44 (see also FIGS. 3 and 4) or due to the warning lamp 41 being in the "off" position, then flow of current is possible. If $A_1$ and Ao are in the 1-signal condition, then motor 40 with an amplifier 59 in series before it, is set into operation. Moreover, $A_1$ and the 0-signal of $J_{Sperr}$ from the monoflop 60 arrive at a second AND-section 61, so that the lamp, with an amplifier 62 in series for this purpose, is switched on. If a certain bore 47 of drum 43, 44 runs over the semiconductor (e.g., here $H_{10}$) at which the fault appears with 1-signal, then through-passage is blocked (Ao becomes 0). The AND-section 58 is thus blocked and motor 40 remains stationary. The 1-0-transition of Ao causes the switch-on of monoflop 60 which, after expiry of the adjusted time, delivers a brief suppression impulse. This blocks the AND-section 61 and lamp 41 is extinguished for a brief period. Now, since the current path at the semiconductor is open again, motor 40 continues running. After termination of the suppression impulse lamp 41 also lights up again, so that the semiconductor corresponding to the fault can be blocked again.

The above-described switching arrangements according to FIGS. 5, 6 and 7 are merely embodiments in which the possibilities of the invention are by no means exhausted. Thus for example in the switching arrangements according to FIGS. 5 and 6, it is conceivable to replace the contact ring 27 and contact arm 33 by a contactless control through light-sensitive semiconductors according to FIG. 7, and if need be, it is possible to add still further amplifying and converting sections without thereby departing from the ambit of the invention. Similarly it is also conceivable, in the case of the switching arrangement according to FIG. 7, to substitute the semiconductor control by a contact control corresponding to FIGS. 5 and 6.

I claim:

1. A system for indicating the occurrence of each of a plurality of events in a motor vehicle, comprising: a plurality of monitoring means each associated with a respective event for generating an electrical signal upon the occurrence of said respective event; a transparent drum; support means for carrying the drum for relative rotation thereto; an indicator scale disposed around the periphery of the drum, the indicator scale being divided into a plurality of indicating segments each associated with a respective event; a viewing window adjacent the periphery of the drum, the indicating segments being sequentially positioned adjacent the viewing window as the drum is rotated; a lamp carried by the support means within the drum and opposite the viewing window for illuminating the indicating segment adjacent the viewing window when said lamp is energized; a motor having an output shaft coupled to the drum for rotating the drum when said motor is energized; means for energizing the motor; and circuit means coupled to the plurality of monitoring means, the lamp and the motor and responsive to an electrical signal generated by one of the monitoring means in response to the occurrence of an event for deenergizing the motor and energizing the lamp for a specified time duration after the indicating segment associated with said event is positioned adjacent the viewing window, whereby an indication of the occurrence of the event is provided for the specified time duration.

2. A system as claimed in claim 1 wherein the circuit means includes a plurality of circularly spaced contacts carried by the support means, each of the contacts being connected to a respective monitoring means and further includes a contact arm connected to the drum so as to sequentially engage the contacts as the drum is rotated.

3. A system as claimed in claim 2 wherein the circuit means further includes a transistor switch coupled to the contact arm and the motor, the transistor switch being switched by an electrical signal from one of the monitoring means to deenergize the motor when the contact arm engages the respective contact.

4. A system for indicating the occurrence of each of a plurality of events in a motor vehicle, comprising: a plurality of monitoring means each associated with a respective event for generating an electrical signal upon the occurrence of said respective event; a transparent drum; support means for carrying the drum for relative rotation thereto; an indicator scale disposed around the periphery of the drum, the indicator scale being divided into a plurality of indicating segments each associated with a respective event; a viewing window adjacent the periphery of the drum, the indicating segments being sequentially positioned adjacent the viewing window as the drum is rotated; a lamp carried by the support means within the drum and opposite the viewing window for illuminating the indicating segment adjacent the viewing window when said lamp is energized; a motor having an output shaft coupled to the drum for rotating the drum when said motor is energized; energizing circuit means for energizing the motor, the energizing circuit means including gate means coupled to the plurality of monitoring means and responsive to an electrical signal generated by one of said monitoring means for initiating the energization of the motor; means coupled to the plurality of monitoring means and the lamp for energizing the lamp upon the occurrence of an event; a plurality of light sensitive semiconductor elements each connected to a respective monitoring means; means coupled to the drum for rotation therewith for sequentially exposing the light sensitive semiconductor elements to the lamp so as to sequentially illuminate said exposed elements as the drum is rotated; first deenergizing means coupled to the light sensitive semiconductor elements for deenergizing the motor while one of the light sensitive semiconductor elements coupled to a monitoring means generating an electrical signal is illuminated; and second deenergizing means coupled to the light sensitive semiconductor elements for deenergizing the lamp a predetermined time period after the motor is deenergized by the first deenergizing means.

* * * * *

PO-1050
(5/69)

UNITED STATES PATENT OFFICE
CERTIFICATE OF CORRECTION

Patent No. __3,835,450__  Dated __September 10, 1974__

Inventor(s) __Lothar Reck__

It is certified that error appears in the above-identified patent and that said Letters Patent are hereby corrected as shown below:

On the title page, column 1, the following references should be added:

| | | | |
|---|---|---|---|
| 2,799,846 | 7/1957 | Negrin et al | 340/413 |
| 2,840,807 | 6/1958 | Todd et al | 340/324S |
| 3,020,531 | 2/1962 | Appleton | 340/324R |
| 3,103,645 | 9/1963 | Savage | 340/21 |
| 3,281,819 | 10/1966 | Muller | 340/324R |
| 3,541,550 | 11/1970 | Hamre | 340/413 |
| 3,555,539 | 1/1971 | Richards | 340/324R |
| 3,671,962 | 6/1972 | Fales | 340/378R |

Signed and sealed this 4th day of February 1975.

(SEAL)
Attest:

McCOY M. GIBSON JR.
Attesting Officer

C. MARSHALL DANN
Commissioner of Patents